(12) United States Patent
Lagerkvist

(10) Patent No.: US 8,231,045 B2
(45) Date of Patent: Jul. 31, 2012

(54) WELDING CRANE WITH WELDING HEAD

(75) Inventor: Arne Lagerkvist, Göteborg (SE)

(73) Assignee: ESAB AB, Goetegorg (SE)

( * ) Notice: Subject to any disclaimer, the term of this patent is extended or adjusted under 35 U.S.C. 154(b) by 0 days.

(21) Appl. No.: 12/920,635

(22) PCT Filed: Mar. 13, 2009

(86) PCT No.: PCT/SE2009/050261
§ 371 (c)(1), (2), (4) Date: Nov. 3, 2010

(87) PCT Pub. No.: WO2009/113960
PCT Pub. Date: Sep. 17, 2009

(65) Prior Publication Data
US 2011/0036898 A1 Feb. 17, 2011

(30) Foreign Application Priority Data
Mar. 13, 2008 (SE) ...................................... 0800587

(51) Int. Cl.
*B23K 37/02* (2006.01)
(52) U.S. Cl. ........... 228/45; 228/25; 228/32; 219/124.1; 219/125.1; 248/155.3; 248/646; 248/657
(58) Field of Classification Search ................... 228/25, 228/32, 45; 219/124.1, 125.1; 248/155.3, 248/646, 657
See application file for complete search history.

(56) References Cited

U.S. PATENT DOCUMENTS

| | | | | |
|---|---|---|---|---|
| 2,909,394 A * | 10/1959 | Wuesthoff | ..................... | 384/11 |
| 3,031,566 A * | 4/1962 | Wuesthoff | ................. | 219/125.1 |
| 3,543,989 A * | 12/1970 | Cooper | ........................... | 228/25 |
| 4,014,495 A * | 3/1977 | Oda et al. | ......................... | 228/7 |
| 4,660,753 A * | 4/1987 | Kushibe et al. | ................. | 228/48 |
| 5,232,192 A * | 8/1993 | Akutagawa | ................... | 248/646 |
| 2003/0222055 A1 * | 12/2003 | Marek et al. | ............... | 219/86.25 |

FOREIGN PATENT DOCUMENTS

| | | |
|---|---|---|
| DE | 7612106 U | 10/1976 |
| EP | 0644150 A1 | 3/1995 |
| FR | 2641723 A1 | 7/1990 |
| WO | 2007134676 A1 | 11/2007 |

* cited by examiner

*Primary Examiner* — Jessica L Ward
*Assistant Examiner* — Devang R Patel

(57) ABSTRACT

A suggested welding crane for welding of objects comprises an arm, a stand and a welding head. The arm includes at least a first and a second segment, which are arranged with their length axes essentially parallelly and are telescopically movable along their length axes in relation to each other so that at least a first segment of said segments at least partly slides into at least a second segment of said segments. The welding head is arranged in a distal end of an outermost segment of the arm while an innermost segment of the arm is suspended in the stand. A linear guide is arranged on at least a first segment of said segments. A co-operating part of said at least one linear guide is arranged on at least a second segment of said segments, wherein the at least one linear guide is adapted to provide said telescopic movement.

11 Claims, 4 Drawing Sheets

US 8,231,045 B2

WELDING CRANE WITH WELDING HEAD

FIELD OF THE INVENTION

Figure 1:
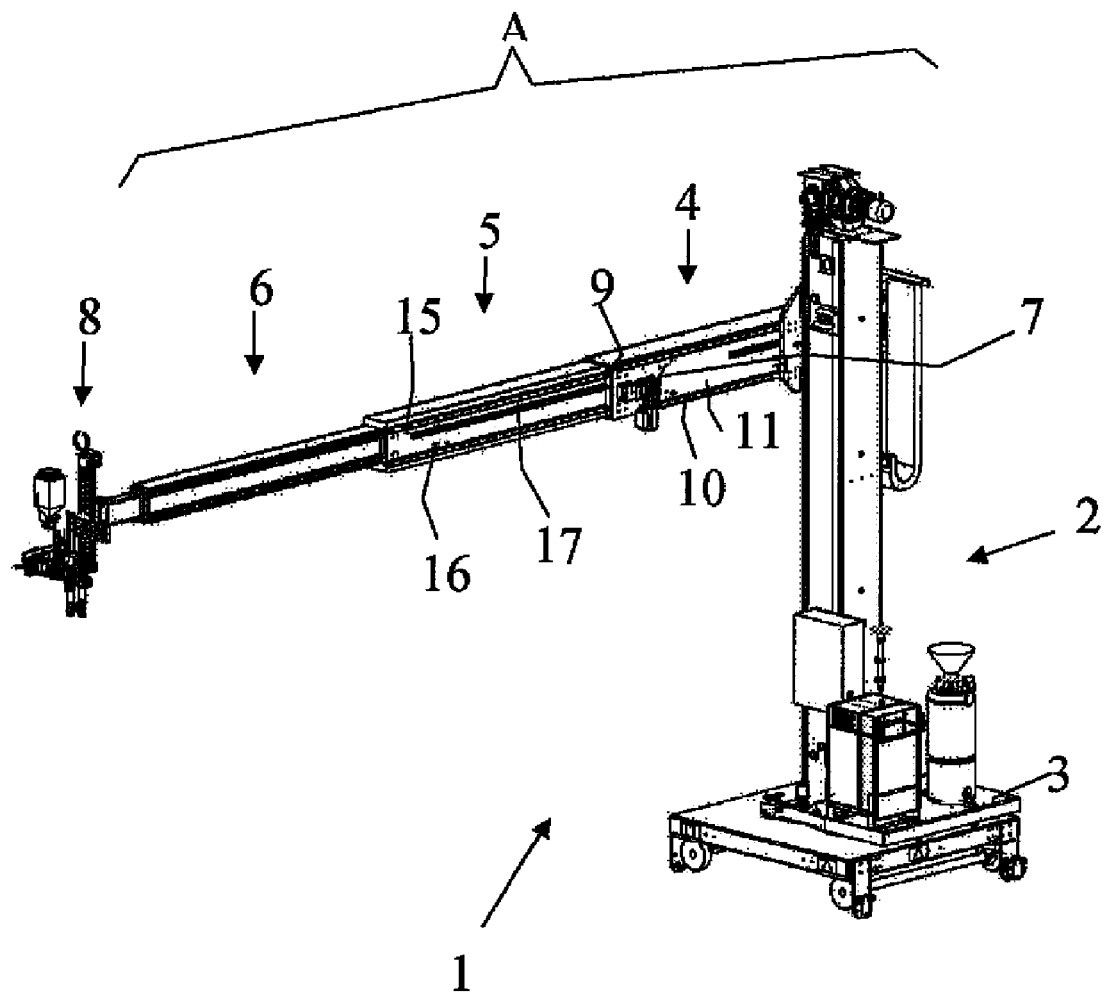

The present invention relates generally to a welding crane with a welding head.

BACKGROUND OF THE INVENTION

During machine welding of large objects a so-called welding crane is often used in order to reach the welding points on the objects. Generally, powder welding is used for welding on large objects, but also other welding techniques may be used. The industry of today requires the possibility to weld increasingly large objects at the same time as the crane on which the weld is arranged shall require as little space as possible. Furthermore, it is desirable that the welding crane has a relatively large range.

The US patent U.S. Pat. No. 3,031,566 A1 describes a welding manipulator with a foldable boom which is movable back and forth and is directed to solve the problem that a fixed welding boom requires a lot of space during use. A telescopic boom is provided in order to solve the problem.

The German utility model DE 761 2106 U describes a welding boom with a supporting pillar which is turnably arranged on a carriage and on which supporting pillar there is arranged a telescopic welding boom.

A problem with telescopic welding booms according to the prior art is that the guides for the telescopic movements requires large space. This means that the innermost boom part must be manufactured with an unnecessarily large cross section from a strength point of view. Such a large cross section means that the access during welding of for example pipes is deteriorated. This problem becomes especially large if the welding crane has three or more segments.

SUMMARY OF THE INVENTION

According to on aspect, the present invention is directed to a welding crane, wherein at least one linear guide comprises at least one rail and at least one sled which is arranged to be moved along said at least one rail. The linear guide is arranged on at least a first segment of said segments, and a co-operating part of said at least one linear guide is arranged on at least a second segment of said segments. The linear guide is here adapted to allow telescopic movement of the first segment relative to the second segment.

As used herein, the term "rail" should be broadly construed to mean an elongated object having a longitudinal axis and essentially substantially constant cross section. The term "sled" as used herein should be broadly construed to mean a device which is moveable in the length direction of the corresponding rail. The sled and the rail may have one of many different forms in order to achieve this. In light of the invention a person skilled in the art may choose a suitable form for the rail and the sled.

The proposed welding crane is advantageous as its arm may be made flexible as well as robust at the same time as the arm has a long range.

It is advantageous to have a linear guide comprising a rail and a sled as such a construction allows for uncomplicated maintenance. Furthermore, the construction is associated with relatively small safety risks, for example with regard to squeezing. Preferably the linear guide comprises at least two sleds for each rail. This gives increased stability to the arm.

According to an embodiment of the invention at least one element of the at least one linear guide is arranged on an outer surface of a side wall of one of said segments. Thereby, the telescopic arm may be made compact, as the building height becomes relatively low. Furthermore, the construction can be cost efficient.

According to yet another embodiment of the invention the rail in at least one linear guide is arranged on an outer surface of a second segment. Further, at least one ancillary sled is arranged on an inner surface of a first segment. The second segment is here telescopically movable along a length axis in relation to the first segment. Alternatively, or as a complement thereto, the rail in at least one linear guide may be arranged on an inner surface of a first segment, wherein at least one ancillary sled is arranged on an outer surface of a second segment. Also here the second segment is telescopically movable along a length axis in relation to the first segment. By an adequate choice of surfaces on which sleds are mounted the construction may thereby be adapted so that the bending load on the rails, during adjustment of the telescopic arm to less than maximum extension, becomes relatively low, and the expected life of the arm is thereby extended.

According to another embodiment of the invention at least one of the linear guides comprises a ball rail guide. Here the sled comprises balls which are arranged to lie against at least two essentially opposite sides of the rail. Thereby a very low friction between the different segments of the arm is achieved.

According to another embodiment of the invention at least one of the linear guides comprises a roll rail guide. Here the sled instead comprises rolls which are suspended in the sled and which are arranged to lie against at least two essentially opposite sides of the rail. Also here the friction becomes very low.

According to a further different embodiment of the invention the innermost segment of the telescopic arm is arranged to be adjustable in height in relation to the stand. This is preferable in that it gives a vertical flexibility of the arm and its welding head.

According to yet another embodiment of the invention the stand includes an upper part and a lower part. The upper part is here rotatable around the length axis of the stand in relation to the lower part, which increases the lateral flexibility of the arm considerably.

According to a further embodiment of the invention a rack is arranged on a first segment in combination with at least one linear guide. Here a cogwheel driven by a motor is arranged on a second segment, which through driving of the motor and by engagement of the cogwheel in the rack, is telescopically movable along a length axis in relation to the first segment. Thus, an efficient and flexible telescope function of the suggested arm may be provided.

According to another embodiment of the invention the arm comprises at least three segments. Of these a first segment is arranged closest to the stand. A second segment is arranged in a distal end of the first segment and a third segment is arranged in a distal end of the second segment. Furthermore, the first segment includes an external motor adapted to provide a displacement of the second segment in relation segment to the first segment, and the third segment includes an internal motor adapted to provide a displacement of the third segment in relation to the second segment. Thereby, the intermediate segment, i.e. the second segment, may be constructed entirely passive (for example be relieved from motors and/or control logic).

Further advantages, advantageous features and applications of the present invention will appear from the following description and the dependent claims.

SHORT DESCRIPTION OF THE DRAWINGS

The invention will now be explained closer by embodiments, which are described as examples, and with reference to the appended drawings.

Figure 2:
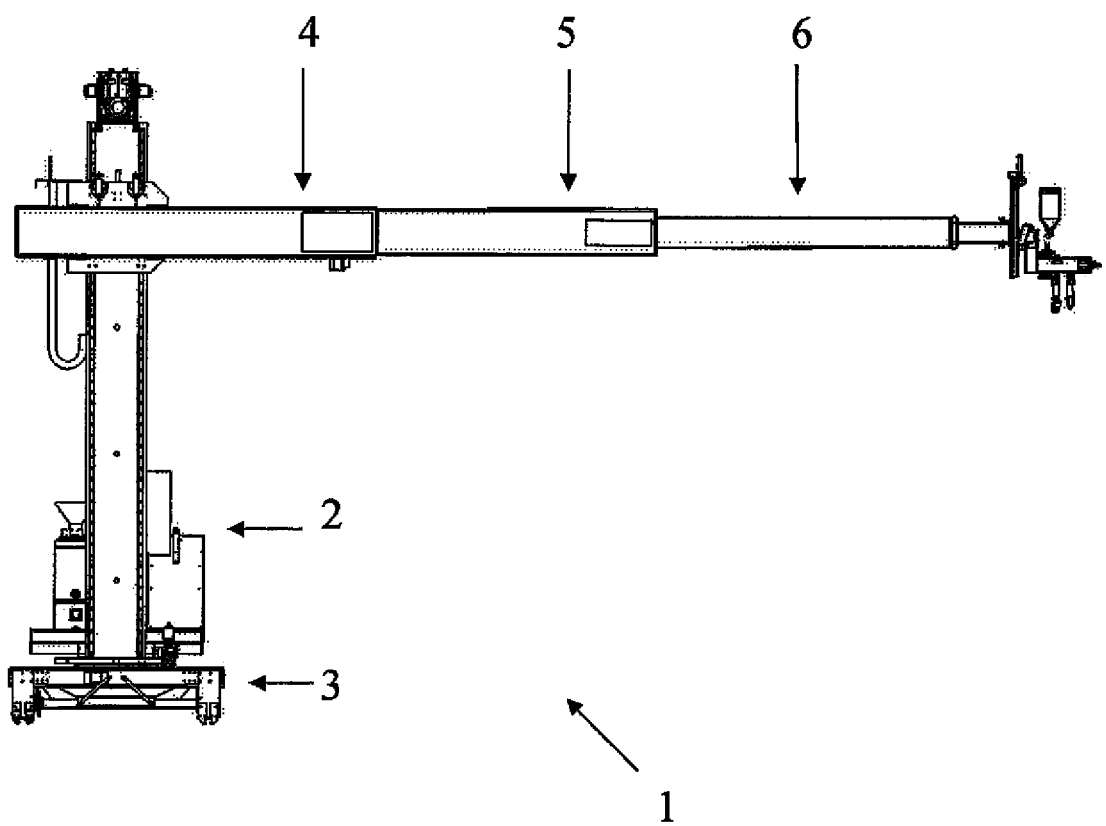
Figure 3:
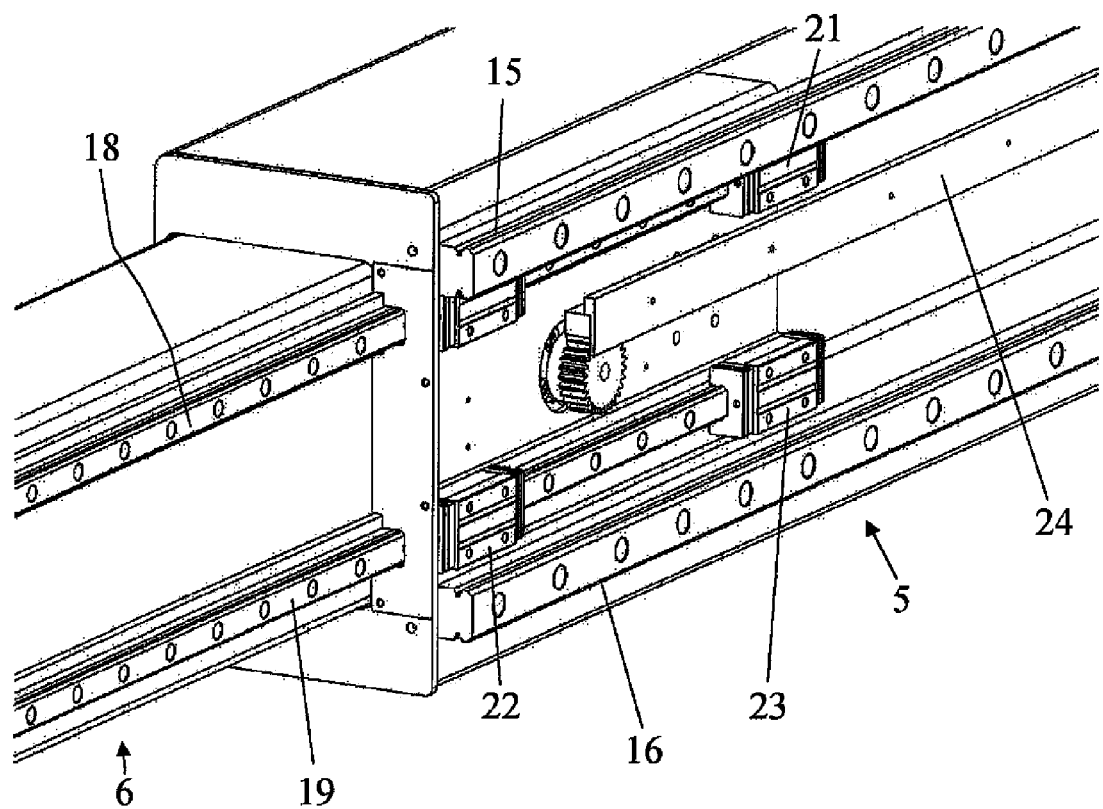
Figure 4:
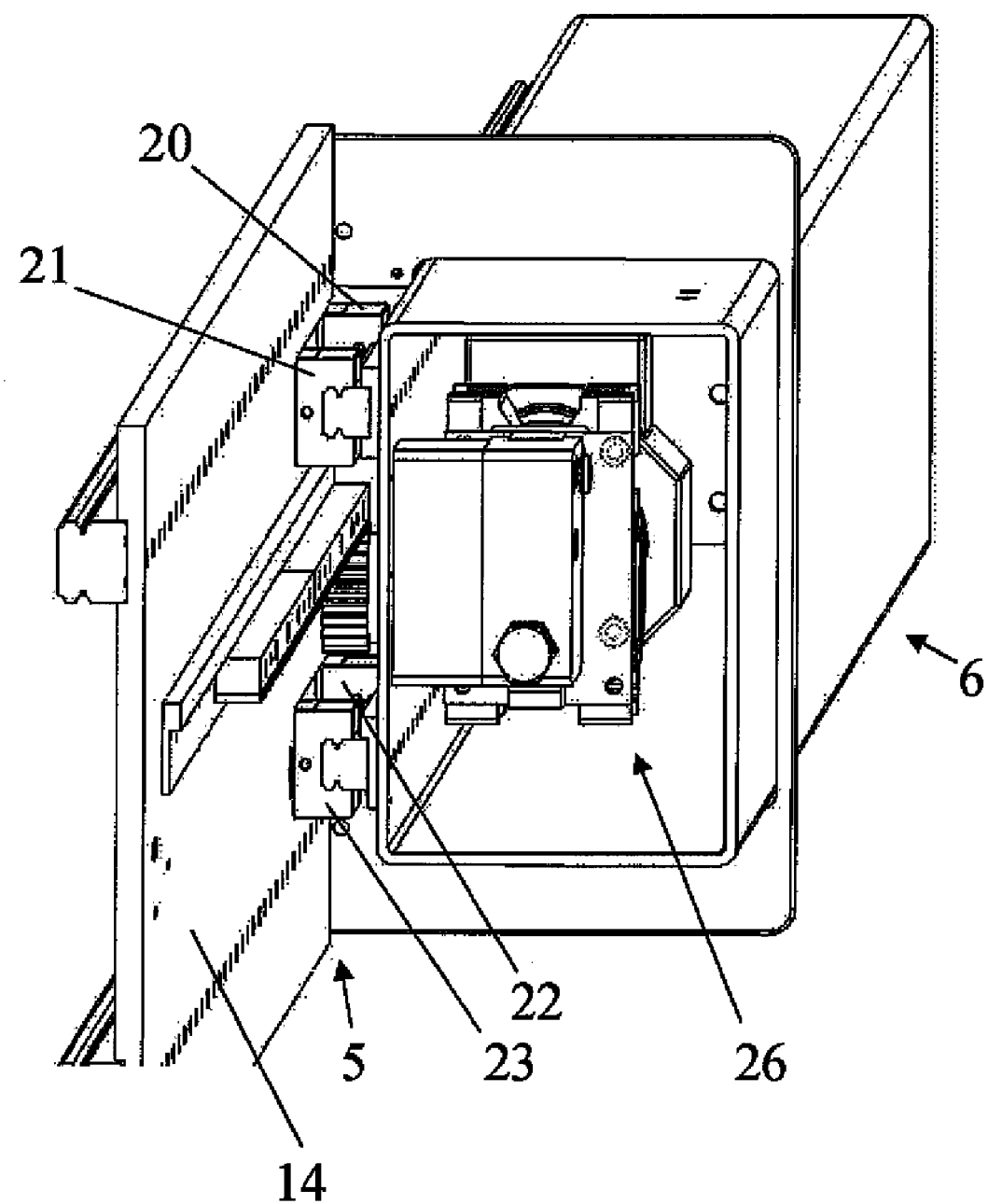

FIG. 1 shows schematically a welding crane according to an embodiment of the present invention, FIG. 2 shows the welding crane in FIG. 1 in a view from the side, FIG. 3 shows in larger detail a part of the welding crane according to an embodiment of the invention, and FIG. 4 shows a cross sectional view of a part of the welding crane.

DESCRIPTION OF PREFERRED EMBODIMENTS OF THE INVENTION

In the following description of preferred embodiments of the invention similar features in different figures will be denoted by the same reference numeral.

FIG. 1 shows schematically a welding crane 1 according to an embodiment of the present invention. The welding crane 1 comprises a stand 2, which is arranged to be placed with a lower part 3 fastened to a rail arranged on a floor. Alternatively, the stand 2 may be placed directly on the floor. The welding crane 1 comprises further an arm A, which in turn includes at least two segments, here 4, 5 and 6, respectively. A first segment 4 is connected to the stand 2 and is adjustable in height in relation to the stand 2. In the embodiment of the invention illustrated in FIG. 1 the welding crane 1 comprises a second segment 5 and a third segment 6. The length axes of the segments 4, 5 and 6, respectively, coincide essentially with the length axis 7. According to the invention, a deviation of up to in the order of 5° between the length axes of the segments 4, 5 and 6 may, however, be accepted. Furthermore, the segments 4, 5 and 6, are adapted to be movable essentially parallelly to the length axis 7 in relation to the stand 2 in a telescopic way, i.e. so that the segments 4, 5 and 6, at least partly are slided into each other. Specifically, this means that the third segment 6 may be slided into the second segment 5, which in turn may be slided into the first segment 4. In other words, the second segment 5 is arranged movably along the length axis 7 in relation to the first segment 4 and may at least partly be slided into the first segment 4. In the corresponding way the third segment 6 is arranged movably in relation to the second segment 5 and may at least partly be slided into the second segment 5. According to an embodiment of the invention the first segment 4 is further adapted to be displaced essentially along the length axis 7 in relation to the stand 2. Furthermore, an upper part of the stand 2, to which the first segment 4 is connected, is preferably rotatable in relation to the lower part 3 of the stand 2. This function may for example be provided using a roller path bearing, or a corresponding construction elements, arranged between the upper part 2 and the lower part 3 of the stand.

The welding crane 1 comprises also a welding head 8 for welding, which welding head 8 is arranged in a distal end of the outermost segment (here that is to say the third segment 6) from the stand 2.

In order to allow the above mentioned telescopic displacement the first segment 4 may for example be essentially cylindrically formed and comprise an upper side wall 9, lower side wall 10 (not visible in FIG. 1) and side walls of which only a first side wall 11 is visible in FIG. 1. The second segment 5 may in a corresponding way be essentially cylindrically formed and comprise an upper side wall 12, a lower side wall 13 (not visible in FIG. 1) and side walls of which only a first side wall 14 is visible in FIG. 1. Apart from said cylindrical form the segments 4, 5 and 6, may according to the invention have an arbitrary cross sectional form, such as essentially rectangular (as is shown in FIG. 1), given that the segments 4, 5 and 6, are hollow, relatively thin walled and are open at relevant short sides. In the general case this means that all segments except for the outermost at least need to be open at their respective outermost short sides in order to allow the suggested telescopic function of the arm A.

In the illustrated example a first rail 15 is arranged parallel to a second rail 16 and a rack 17 on the first side wall 14 of the second segment 5. Preferably, the telescopic arm A is also designed so that at least two, and possibly all, of the segments 4, 5 and 6, are slided in or out during adjustment of the lateral position of the welding head 8 along the length axis 7.

During welding using the welding crane 1 the object or the objects, which are to be welded are suitably stationary in relation to the welding crane 1 while the welding head 8 is controlled to desired welding positions, for example by suitable extension of the segments 4, 5 and 6, of the arm A. Alternatively, welding objects may be rotated around the length axis. This is especially preferable during manufacturing of pipes. During so-called length welding of a pipe the pipe is arranged parallelly to the length axis 7 of the arm A and the welding head 8 is controlled to move along the length axis 7 along the pipe. During so-called circumferential welding (or circular welding) the welding object is however suitably rotated around its own axis. The welding crane 1 is here placed so that the rotational axis of the pipe is parallel to the length axis 7 of the arm A while the welding head 8 is held essentially fixed in a given position. Possibly a small adjustment of the position of the welding head 8 may be necessary, for example as a consequence of small irregularities of the welding object.

FIG. 2 shows the welding crane 1 in FIG. 1 in a view from the side. In FIG. 2 the second segment 5 and the third segment 6 of the arm A are in their outermost positions, respectively.

FIG. 3 shows in closer detail a part of the second segment 5 and the third segment 6 with the first side wall 14 cut away. On the second segment 5 there is arranged a first rail 15 and a second rail 16. In the corresponding way there is arranged, on the third segment 6, a first rail 18 and a second rail 19 which are arranged parallel to each other and to the length axis 7. On the second segment 5 there is arranged a first sled 20 and a second sled 21, which are in engagement with the first rail 18 on the third segment 6; and a third sled 22 and a fourth sled 23, which are in engagement with the second rail 19 on the third segment 6. The sleds 20-23 are free to move only in the length axis of the ancillary rail. The sleds 20, 21, 22 and 23, may be provided with rolls or balls which lies against the rails 18 and 19. On the second segment 5 there is also arranged a rack 24 which is parallel to the length axis 7. On the third segment 6 there is arranged a cogwheel 25, which is driven by a motor 26 (see FIG. 4).

When running the motor 26, so that the cogwheel 25 is rotating the cogwheel 25 and thereby the third segment 6 will be moved in relation to the rack 24 and thereby the second segment 5. During the movement the rails 18 and 19 will slide through the sleds 20, 21, 22 and 23. By controlling the rotational speed and rotational direction of the cogwheel 25 the direction of movement and speed of movement of the third segment 6 in relation to the second segment 5 may thus be controlled. According to the invention at least one linear guide is thus arranged on the segments 5 and 6, so that a part of the segment 6 via a co-operating part connected to another segment provides the telescopic movement of the segments in relation to each other.

FIG. 4 shows a cross sectional view, which illustrates a part of the second segment 5 and the third segment 6. As is shown the sleds 20, 21, 22 and 23 are arranged on the inside of the first side wall 14 on the second segment 5. In FIG. 4 the motor 26 is also shown which is arranged within the third segment 6.

The invention is not limited to the embodiments described in the Figures but may be varied freely within the scope of the claims. Specifically the invention is not limited to a welding crane 1 with an arm A comprising three segments. On the contrary the invention is equally applicable to arms A with an arbitrary amount of segments larger than or equal to two.

The invention claimed is:

1. A welding crane for welding objects, which welding crane comprises:
    an arm including at least a first and a second segment which are arranged with their respective length axes essentially parallelly and which are telescopically movable along their length axes in relation to each other so that at least a second segment of said segments at least partly slides into at least a first segment of said segments, wherein at least one of the first segment and the second segment comprises an upper side wall, a lower side wall and a connecting side wall connecting the upper side wall and the lower side wall,
    a stand, and
    a welding head arranged in a distal end of an outermost segment of said segments of the arm, and wherein an innermost segment of said segments of the arm is suspended in the stand;
    at least one linear guide, which comprises at least one rail and at least one sled which is arranged to slide along the at least one rail, the at least one sled being arranged between the upper side wall and the lower side wall and adjacent to said connecting side wall of at least one of the first segment and the second segment, the at least one linear guide is arranged on at least a first segment of said segments and that a co-operating part of said at least one linear guide is arranged on at least a second segment of said segments, wherein the at least one linear guide is adapted to allow said telescopic movement.

2. The welding crane according to claim 1, wherein at least one element of the at least one linear guide is arranged on an outer surface of a side wall of one of said segments.

3. The welding crane according to claim 1, wherein the linear guide comprises at least two sleds for each rail.

4. The welding crane according to claim 1, wherein the rail in at least one linear guide is arranged on an outer surface of a second segment of said segments and at least one ancillary sled is arranged on an inner surface of a first segment of said segments, which second segment is telescopically movable along a length axis in relation to the first segment.

5. The welding crane according to claim 1, wherein the rail in at least one linear guide is arranged on an inner surface of a first segment of said segments and an ancillary at least one sled is arranged on an outer surface of a second segment of said segments, which second segment is telescopically movable along a length axis in relation to the first segment.

6. The welding crane according to claim 1, wherein at least one of the linear guides includes a ball rail guide, wherein the sled comprises balls which are arranged to lie against at least two essentially opposite sides of the rail.

7. The welding crane according to claim 1, wherein at least one of the linear guides includes a roll rail guide, wherein the sled comprises rolls which are suspended in the sled and which are arranged to lie against at least two essentially opposite sides of the rail.

8. The welding crane according to claim 1, wherein the inner most segment is arranged to be adjustable in height in relation to the stand.

9. The welding crane according to claim 1, wherein the stand includes an upper part and a lower part, and wherein the upper part is rotatable around the length axis of the stand in relation to the lower part.

10. The welding crane according to claim 1, wherein a rack is arranged on a first segment of said segments in combination with at least one linear guide, and wherein a cogwheel driven by a motor is arranged on a second segment of said segments, which second segment by driving the motor and engagement of the cogwheel in the rack is telescopically movable along a length axis in relation to the first segment.

11. The welding crane according to claim 1, wherein the arm comprises at least three segments of which:
    a first segment is arranged closest to the stand,
    a second segment is arranged in a distal part of the first segment, and
    a third segment is arranged in a distal part of the second segment, wherein the first segment includes an external motor adapted to provide a displacement of the second segment in relation to the first segment, and wherein the third segment includes an internal motor adapted to provide a displacement of the third segment in relation to the second segment.

* * * * *